(12) United States Patent
Ozaki et al.

(10) Patent No.: US 6,314,246 B1
(45) Date of Patent: Nov. 6, 2001

(54) VIEWFINDER OPTICAL SYSTEM OF A SINGLE-LENS REFLEX CAMERA

(75) Inventors: Hiroyasu Ozaki, Tokyo; Takayuki Ito, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/475,659

(22) Filed: Dec. 30, 1999

(30) Foreign Application Priority Data

Jan. 7, 1999 (JP) .................................................. 11-001820

(51) Int. Cl.$^7$ ............................ G03B 13/02; G03B 13/08
(52) U.S. Cl. ............................................. 396/384; 396/386
(58) Field of Search ............................. 359/638; 396/373, 396/382, 384, 386

(56) References Cited

U.S. PATENT DOCUMENTS

| | | | |
|---|---|---|---|
| 4,171,888 | 10/1979 | Shono et al. | 354/155 |
| 4,731,625 | * 3/1988 | Nozawa | 354/155 |
| 5,526,083 | 6/1996 | Misawa | 354/225 |
| 5,903,788 | * 5/1999 | Mukai et al. | 396/373 |
| 6,091,910 | * 7/2000 | Mihara | 396/373 |

\* cited by examiner

*Primary Examiner*—Christopher E. Mahoney
(74) *Attorney, Agent, or Firm*—Greenblum & Bernstein, P.L.C.

(57) ABSTRACT

A viewfinder optical system of a single-lens reflex camera has a photographic optical system and an image plane positioned on an optical axis of the photographic optical system. The system includes a first optical member positioned between the photographic optical system and the image plane, the first optical member bending the optical axis of the photographic optical system to define a viewfinder optical axis of the viewfinder optical system. A second optical member bends the viewfinder optical axis at least once to make the viewfinder optical axis that extends parallel to the optical axis of the photographic optical system. A third optical member, having substantially no optical power, is positioned on the viewfinder optical axis extending parallel to the optical axis of the photographic optical system. The third optical member is made of a transparent material having a refractive index higher than the refractive index of air. An eyepiece is positioned behind the third optical member on the viewfinder optical axis.

21 Claims, 2 Drawing Sheets

VIEWFINDER OPTICAL SYSTEM OF A SINGLE-LENS REFLEX CAMERA

BACKGROUND OF THE INVENTION

1. Field of the Invention

The present invention relates to a viewfinder optical system which can be advantageously used for an SLR camera (e.g., an SLR camera using silver-halide film or a digital SLR camera) in which the distance between the image plane (e.g., the sensitive surface of an image pick-up device or a silver-halide film) and the back face of the camera has to be relatively long.

2. Description of the Related Art

SLR cameras are generally provided with a viewfinder optical system through which the object image formed on a focusing glass (i.e., a focusing screen) positioned above the mirror box is viewed as an erect image at the eye of the user (photographer). In most cases, the viewfinder optical system is of a type which includes a pentagonal roof prism and an eyepiece positioned behind the exit surface of the pentagonal roof prism. In this type of viewfinder optical system, an optical axis of the viewfinder optical system which extends through, and perpendicularly to, the approximate center of the focusing glass, is bent rearward via the pentagonal roof prism so as to extend parallel to the optical axis of the photographic lens to enter the eyepiece. The object image formed on the focusing glass is magnified by the eyepiece to be viewed by the user.

Due to the recent popularization of digital cameras, there has been an attempt to combine the advantage of an image processing function, which is unique to digital cameras, with the advantage of the optical system being free from parallax error, which is unique to SLR cameras, by combining the structure of a digital camera with the structure of an SLR camera. For example, there has been an attempt to replace the back lid of a conventional SLR camera with a back lid which has a CCD image sensor, an electric circuit and a data recording medium (e.g., a flash memory card or a floppy disk drive) provided therein, so that the conventional SLR camera can be used as an SLR digital camera. Furthermore, there has been an attempt to design the body of an SLR camera to be used exclusively as a digital camera body in which a CCD image sensor is fixed at a position at which sensitive film was formerly positioned in a conventional SLR camera.

FIG. 2 is a schematic illustration showing the arrangement of fundamental elements of a typical SLR digital camera. As shown in FIG. 2, a typical SLR digital camera is provided, behind a mirror box 12, with a focal-plane shutter unit 13, a CCD image sensor 14 and a recording medium 15 which are arranged in this order from the side of the mirror box 12, which accommodates a quick-return mirror 11 therein. The SLR digital camera is provided above the mirror box 12 with a focusing glass 16 and a pentagonal roof prism 17 which are arranged in this order from the side of the mirror box 12. The SLR digital camera is further provided behind the exit surface 17a of the pentagonal roof prism 17 with an eyepiece 18. In the SLR digital camera having such a structure, the distance between the image plane (i.e., the sensitive surface of the CCD image sensor 14), on which the object image is formed through the photographic lens 19, and a back face C of the SLR camera is much longer than that of a typical SLR camera using silver-halide film.

The distance between the image plane and the back face of a multi-functional SLR camera using silver-halide film produced in recent years is also longer than that of a conventional simple SLR camera because such a multi-functional SLR camera often have various electric circuits, mechanisms and/or specially-prepared accessories provided behind the film plane.

In an SLR digital camera in which the distance between the sensitive surface of the CCD image sensor and the back face of the camera is long, a problem arises with the eyepiece of the camera. This problem will be hereinafter discussed.

In FIG. 2, in the case where the eyepiece 18 is arranged behind the pentagonal roof prism 17 at a position "A" shown by a dotted line, namely, wherein the eyepiece 18 is arranged at a position substantially identical to the position at which the eyepiece of a conventional SLR camera using silver-halide film is arranged, part of the camera body in which the CCD image sensor 14 and the recording medium 15 are accommodated bulges rearward by a considerable amount. Accordingly, when the user aligns his/her eye with the eyepiece, the camera body tends to interfere, especially around the cheek area. As a result, the user cannot look into the eyepiece 18 with his or her eye positioned closely to the eyepiece 18, which makes it difficult for the user to view through the eyepiece 18. To eliminate this problem, the viewfinder optical system can be designed so that the exit pupil of the eyepiece 18 is formed at a position on a plane, which includes the back face of the camera, by establishing a long eye relief of the eyepiece 18 (distance between the rear surface of the eyepiece 18 and the eye point thereof). However, according to such a design, both the lens diameter of the eyepiece 18 and the size of the pentagonal roof prism 17 must be increased, which makes the camera bulky (i.e., the physical size thereof is increased).

In order to eliminate the aforementioned problem without increasing either the lens diameter of the eyepiece 18 or the size of the pentagonal roof prism 17, if the eyepiece 18 is fixed at a position "B" shown by a solid line in FIG. 2, the focal length of the eyepiece 18 must be made longer than that in the case where the eyepiece 18 is fixed at the position "A" (i.e., the focal length of the eyepiece 18 must be extended by a length corresponding to the distance between the positions A and B). As a result, the magnification of finder decreases to thereby arise a problem of decreasing the apparent visual angle relative to the subject.

SUMMARY OF THE INVENTION

The present invention has been devised so as to overcome the aforementioned problems which occur in SLR cameras in which the distance between the image plane, on which the object image is formed through the photographic lens, and the back face of the camera is long. The primary object of the present invention is to provide a viewfinder optical system which can be advantageously used for an SLR camera and which makes it possible to provide the eyepiece in the close vicinity of the back face of the camera without making the focal length of the eyepiece too long, to thereby provide a compact viewfinder having a high finder magnification that can be easily viewed via the eyepiece thereof.

To achieve the object mentioned above, according to an aspect of the present invention, a viewfinder optical system of a single-lens reflex camera is provided, having a photographic optical system and an image plane positioned on an optical axis of the photographic optical system, the camera photographing an object image formed on the image plane through the photographic optical system, the viewfinder optical system includes a first optical member positioned between the photographic optical system and the image plane, the first optical member bending the optical axis of the photographic optical system to define a viewfinder optical axis of the viewfinder optical system; a second optical member which bends the viewfinder optical axis at least once to make the viewfinder optical axis extend parallel to the optical axis of the photographic optical system; a third optical member, having substantially no optical power, positioned on the viewfinder optical axis extending parallel to the optical axis of the photographic optical system, the third optical member being made of a transparent material having a refractive index higher than the refractive index of air; and an eyepiece positioned behind the third optical member on the viewfinder optical axis extending parallel to the optical axis of the photographic optical system.

Preferably, the following condition (1) is satisfied:

$$0.2 < d/fe < 0.6 \qquad (1);$$

wherein "d" represents the actual thickness of the third optical member in the direction of the viewfinder optical axis extending parallel to the optical axis of the photographic optical system, and "fe" represents the focal length of the eyepiece.

Preferably, the second optical member includes a prism, the third optical member being positioned between the prism and the eyepiece.

Preferably, the third optical member is made of glass.

The prism can be either a pentagonal roof prism or a pentagonal roof mirror.

The first optical member can be either a quick-return mirror or a half mirror.

The single-lens reflex camera can be of a type which uses silver-halide film, the image plane corresponding to a sensitive surface of the silver-halide film.

Alternatively, the single-lens reflex camera can a digital single-lens reflex camera having an image pick-up device, the image plane corresponding to a sensitive surface of the image pick-up device.

Preferably, the image pick-up device includes a CCD image sensor.

The single-lens reflex camera can be a digital single-lens reflex camera having an image pick-up device; the digital single-lens reflex camera including a shutter unit, the image pick-up device, and a recording medium, which are positioned behind the first optical member in that order from the first optical member side.

Preferably, a focusing glass is also provided which is positioned between the first optical member and the second optical member.

Preferably, an incident surface of the third optical member is cemented to an exit surface of the second optical member.

Preferably, the following condition (2) is satisfied:

$$|fe/ft| < 0.1 \qquad (2);$$

wherein "fe" designates the focal length of said eyepiece, and "ft" designates the focal length of said third optical member.

According to another aspect of the present invention, a single-lens reflex camera is provided which includes a photographic lens; a mirror positioned behind the photographic lens; a focusing glass positioned above the mirror, wherein an object image formed through the photographing lens is formed thereon via said mirror; a pentagonal roof prism positioned above the focusing glass; an eyepiece positioned optically behind the pentagonal roof prism; and a transparent optical member, positioned between the pentagonal roof prism and the eyepiece, made of a transparent material having a refractive index between 1.4 and 2.0; wherein the pentagonal roof prism and the transparent optical member have substantially no optical power. The eyepiece includes an ocular optical system in order for the image formed on the focusing glass to be viewed via the transparent optical member and the pentagonal roof prism.

Preferably, the following condition (1) is satisfied:

$$0.2 < d/fe < 0.6 \qquad (1);$$

wherein "d" represents the actual thickness of the transparent optical member in the optical axis direction of the eyepiece, and "fe" represents the focal length of the eyepiece.

According to another aspect of the present invention, a single-lens reflex camera is provided, including a photographic lens which forms an object image onto an image surface of a recording medium; a mirror positioned on an optical axis of the photographic lens to form an object image formed by the photographing lens onto a focusing screen; an eyepiece, the optical axis thereof being parallel with the optical axis of the photographic lens; a pentagonal roof prism positioned above the focusing glass; and a transparent optical member positioned between the pentagonal roof prism and the eyepiece, the transparent optical member including a transparent material having a refractive index between 1.4 and 2.0; wherein the following condition (1) is satisfied:

$$0.2 < d/fe < 0.6 \qquad (1);$$

wherein "d" represents the actual thickness of the transparent optical member in the optical axis direction of the eyepiece, and "fe" represents the focal length of the eyepiece.

According to the above described structures, the optical path length from a surface (e.g., the matt surface of a focusing glass) which is optically conjugate to the image plane to the incident surface of the eyepiece can be made shorter than the actual length thereof by the difference between the actual thickness of the third optical member and the reduced distance of the same. Consequently, the focal length of the eyepiece can be reduced by the difference in comparison to the case wherein the third optical member is not provided between the second optical member and the eyepiece. As a result, the distance between the second optical member and the eyepiece can be made long without an excessive decrease in the magnification of the finder, so that it is unnecessary to increase the diameter of the eyepiece. This keeps the size of the camera small. Furthermore, since the eyepiece 10 can be positioned in the close vicinity of the back face of the camera even if the distance between the image plane and the back face of the camera is long, it is easy for the user to view through the eyepiece.

The image plane, which is positioned on the optical axis of the photographic optical system, can be either an image plane on which a sensitive surface of silver-halide film is positioned or the sensitive surface of an image-pick up device such as a CCD image sensor. The first optical member can be a quick-return mirror or a half mirror such as a pellicle mirror which is fixedly positioned in the optical axis of the photographic optical system. The second optical member can be a prism such as a pentagonal roof prism or a member consisting of at least one reflecting mirror such as a pentagonal roof mirror. It is preferable that the third optical member be made of a transparent material having a refractive index higher than the refractive index of air, and preferably the third optical member is made of transparent glass, since a higher refractive index can be achieved thereby.

In condition (1), if the value (d/fe) is equal to or greater than 0.6, the third optical member becomes so thick that the rear end of the eyepiece 10 will project from the back face of the camera. If the value (d/fe) is equal to or less than 0.2, the focal length of the eyepiece will become too long, decreasing the magnification of finder. Therefore the value (d/fe) is preferably determined within the range determined by condition (1).

If condition (2) is satisfied, the optical power of the third optical member which is provided in between the second optical member and the eyepiece is zero, or substantially zero.

The present disclosure relates to subject matter contained in Japanese Patent Application No.11-1820 (filed on Jan. 7, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
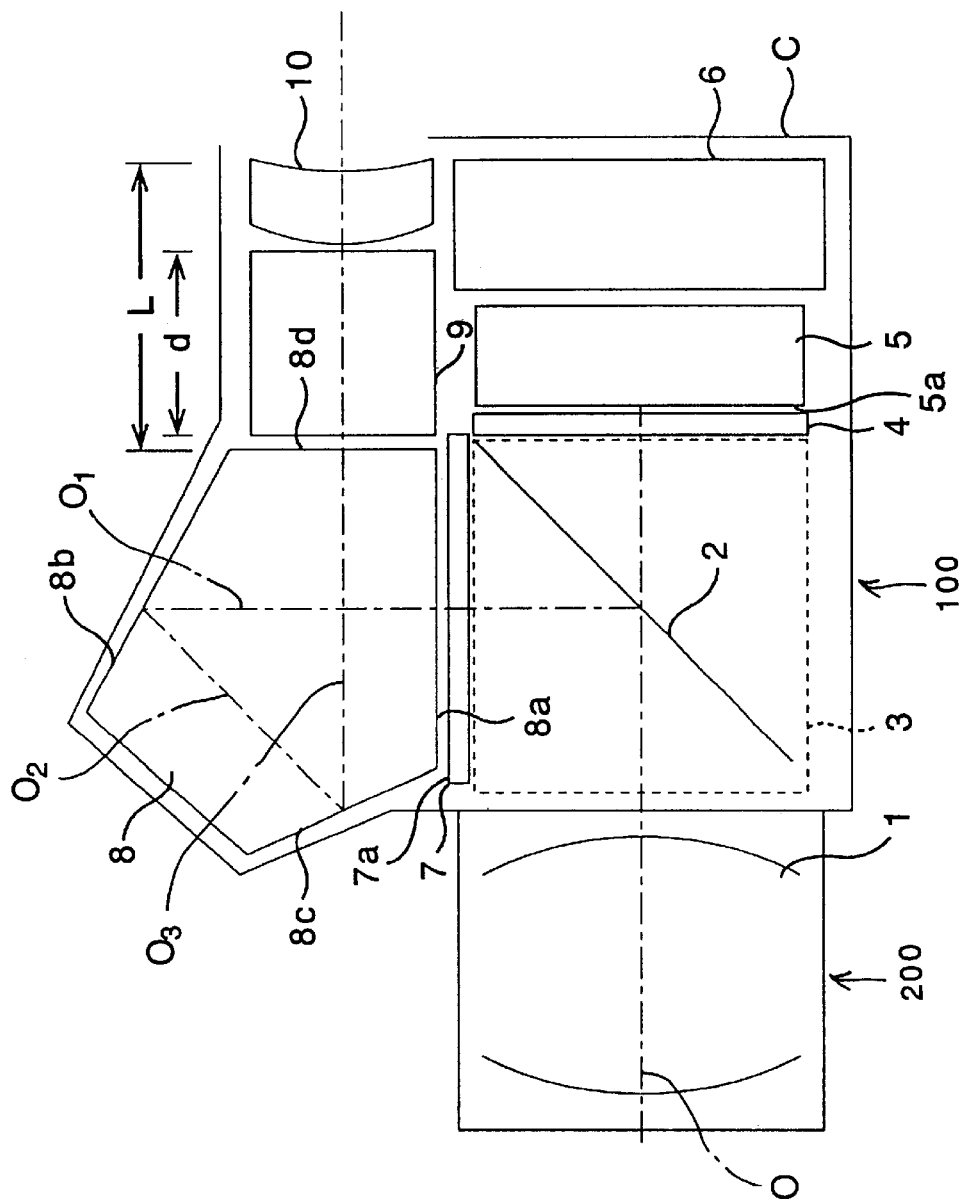
FIG. 1 is a schematic illustration showing the arrangement of fundamental elements of an embodiment of an SLR digital camera to which the present invention is applied.
Figure 2:
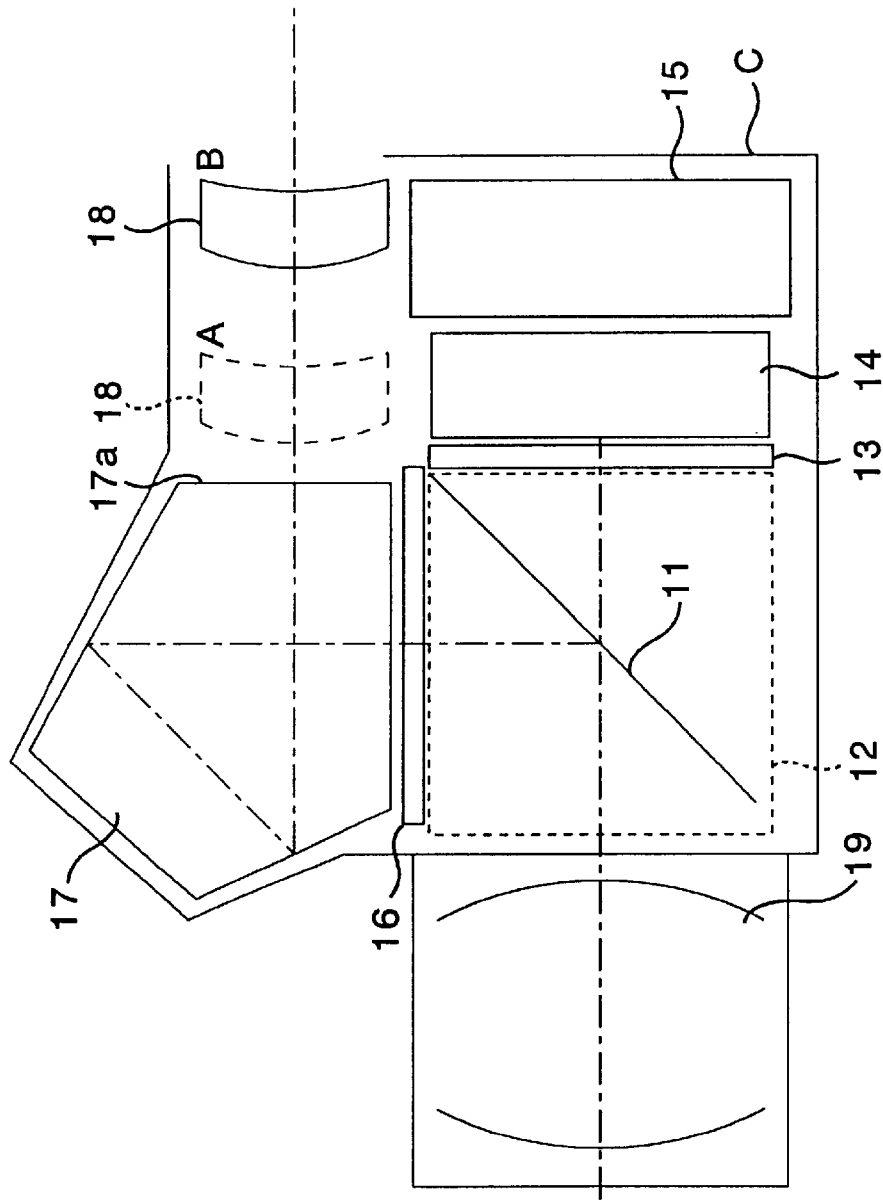
FIG. 2 is a schematic illustration showing the arrangement of fundamental elements of a conventional SLR digital camera.

FIG. 1 shows the arrangement of fundamental elements of an embodiment of an SLR digital camera to which the present invention is applied. The SLR digital camera is provided with a camera body 100 and a photographing lens barrel 200 attached to the front of the camera body 100. The camera body 100 is provided therein with a mirror box 3 which accommodates a quick-return mirror 2. The camera body 100 is provided behind the mirror box 3 with a focal-plane shutter unit 4, a CCD image sensor (image pick-up device) 5 and a recording medium 6, in that order from the mirror box 3 towards the back of the camera. The photographic lens barrel 200 is provided therein with a photographic lens 1, the focal point thereof being adjustable either manually by the user, or automatically by an AF system (not shown), so that the object image is focused on the sensitive surface 5a of the CCD image sensor 5. The CCD image sensor 5 is provided with a large number of photo-diodes arranged in a matrix. Each diode accumulates a certain amount of electric charge according to the quantity of light received, and subsequently, the accumulated electric charge is output one by one at a prescribed time. The output electric charges are converted into image signals of an image read by the CCD image sensor 5. The image signals are input to an image processing circuit (not shown). The image signals, which have undertaken required processes via the image processing circuit, are recorded onto the recording medium 6, which is positioned behind the CCD image sensor 5. The recording medium 6 can be, e.g., a memory card such as a flash memory card or a floppy disk drive which can receive a floppy disk.

The mirror box 3 and the focal-plane shutter unit 4 are arranged in this order from the photographic lens 1 in an optical path between the photographic lens 1 and the CCD image sensor 5. The mirror box 3 accommodates the quick-return mirror 2 which is rotatably supported about a shaft (not shown) positioned at, and along, the edge of the quick-return mirror 2 which is adjacent to the focal-plane shutter unit 4. The quick-return mirror 2, provided as the first optical member of the camera body, is rotatable about the shaft between the viewing position (initial position) wherein the quick-return mirror 2 is inclined by 45 degrees with respect to the optical axis (photographic optical axis) O of the photographing lens 1, and the photographing position wherein the quick-return mirror 2 is retreated from the optical path between the photographic lens 1 and the CCD image sensor 5. The focal-plane shutter unit 4 has a focal-plane shutter provided therein which exposes the sensitive surface 5a of the CCD image sensor 5 to the amount of light corresponding to a set time value, while the quick-return mirror 2 is retreated from the optical path between the photographic lens 1 and the CCD image sensor 5. The CCD image sensor 5 accumulates electric charges while the focal-plane shutter is open upon a photographing operation.

The camera body 100 has a focusing glass 7 provided above the mirror box 3, so that an optical axis $O_1$ (a portion of the viewfinder optical axis) which extends perpendicularly to the optical axis O of the photographing lens 1 between the quick-return mirror 2 and a pentagonal roof prism 8, perpendicularly penetrates the focusing glass 7. The upper surface of the focusing glass 7 is formed as a matt surface 7a, which is optically conjugate to the sensitive surface 5a of the CCD image sensor 5, so that the object image which is to be formed on the sensitive surface 5a is formed on the matt surface 7a when the quick-return mirror 2 is positioned at the viewing position thereof.

The camera body 100 is provided above the focusing glass 7 with the pentagonal roof prism 8, which is provided as the second optical member of the camera body. The pentagonal roof prism 8 is provided with an incident surface 8a, a roof surface 8b, a third reflection surface 8c, and an exit surface 8d. The incident surface 8a faces the focusing glass 7 in a plane parallel thereto. The roof surface 8b includes a first reflecting surface and a second reflecting surface, and the intersection line of the first and second reflecting surface is inclined by 67.5 degrees with respect to the optical axis $O_1$. The third reflecting surface 8c bends an optical axis $O_2$ (a portion of the viewfinder optical axis) which extends from the first and second reflecting surface (roof surface) 8b to the third reflecting surface 8c rearwardly by 45 degrees, so that an optical axis $O_3$ (a portion of the viewfinder optical axis) extends parallel to the optical axis of the photographing lens 1. The exit surface 8d is perpendicular to the optical axis $O_3$. The object image formed as an inverted image on the matt surface 7a is viewed as an erect image when the pentagonal roof prism 8 is viewed from the exit surface 8d thereof.

The camera body 100 is provided, behind the exit surface 8d of the pentagonal roof prism 8, with a glass block 9 and an eyepiece 10, in that order along the optical axis $O_3$ from the pentagonal roof prism 8. The incident surface and the exit surface of the glass block 9 are parallel to each other, and are perpendicular to the optical axis $O_3$. The glass block 9, provided as the third optical member of the camera, is made of a transparent glass having a refractive index n which is higher than the refractive index of air (i.e., n>1), specifically the refractive index n of the transparent glass is in the range of approximately 1.4 through 2.0. The glass block 9 is positioned so as to fill in the space between the pentagonal roof prism 8 and the eyepiece 10. The reduced distance (d/n) of the glass block 9 along the optical axis $O_3$ is shorter than the actual thickness thereof (d) by the difference (d−d/n), so that the optical path length from the matt surface 7a to the incident surface of the eyepiece 10 is reduced accordingly. Consequently, the focal length (fe) of the eyepiece 10 can be reduced by the difference (d−d/n) in comparison to the case wherein the glass block 9 is not provided between the pentagonal roof prism 8 and the eyepiece 10. It is preferable that the incident surface of the glass block 9 be cemented to the exit surface 8d of the pentagonal roof prism 8 to maximize the merit of providing the glass block 9. Although it is preferable that the incident surface and the exit surface of the glass block 9 be perpendicular to the optical axis $O_3$, it is possible for the incident surface and the exit surface of the glass block 9 not to be perpendicular to the optical axis $O_3$, as long as the distortion in an image, that is caused by such an arrangement of the incident and exit surfaces, can be prevented from occurring by any other manner or means.

Preferably, the focal length of the eyepiece 10 (fe) and the actual thickness of the glass block 9 (d) satisfy the following condition (1):

$$0.2 < d/fe < 0.6 \qquad (1)$$

If the glass block 9 is so thick as to make the value (d/fe) to be equal to or greater than 0.6, the rear end of the eyepiece 10 will project from the back face of the camera. If the glass block 9 is so thin as to make the value (d/fe) to be equal to or smaller than 0.2, it will be impossible to reduce the focal length of the eyepiece 10, decreasing the magnification of finder. Therefore, it is preferable that the ratio of the focal length of the eyepiece 10 (fe) to the actual thickness of the glass block 9 (d) be determined within the range shown by the aforementioned condition (1).

Preferably, the following condition (2) is also satisfied:

$$|fe/ft| < 0.1 \qquad (2)$$

wherein ft designates the focal length of the glass block (transparent optical member/third optical member).

If condition (2) is satisfied, the optical power of the glass block which is provided in between the pentagonal roof prism (second optical member) 8 and the eyepiece 10 is zero, or substantially zero.

As can be understood from the above description, in the viewfinder optical system of the present embodiment of the SLR digital camera, since the glass block 9, which is made of a transparent glass having a high refractive index, is positioned between the pentagonal roof prism 8 and the eyepiece 10, the focal length of the eyepiece 10 can be reduced by the difference between the actual thickness of the glass block 9 and the reduced distance thereof along the optical axis $O_3$, as compared with the case without the glass block 9. Accordingly, in an SLR camera in which the distance between the image plane and the back face of the camera is long, the magnification of finder can be prevented from decreasing, even if the eyepiece 10 is positioned in the vicinity of the back face of the camera, without increasing the diameter of the eyepiece, and maintaining ease of viewing therethrough.

Two examples showing the actual dimensions of fundamental elements of the viewfinder optical system of the present embodiment of the SLR digital camera in the case where the area of the sensitive surface 5a of the CCD image sensor 5 corresponds to the area of a film frame of conventional double-perforated 35 mm film will be hereinafter discussed.

EXAMPLE 1

In order to set the distance (L) between the exit surface 8d of the pentagonal roof prism 8 and the exit surface of the eyepiece 10 to 40.00 mm, the glass block 9, which is disposed between the pentagonal roof prism 8 and the eyepiece 10, has a thickness (d) of 30.92 mm along the optical axis $O_3$. The refractive index n of the glass block 9 is 1.5, so that the difference (d−d/n) between the actual thickness (d) and the reduced distance (d/n) is 10.31 mm. Consequently, the focal length (fe) of the eyepiece 10 is reduced by 10.31 mm to thereby become 73.71 mm, as compared with the case without the glass block 9 disposed between the pentagonal roof prism 8 and the eyepiece 10. In this particular example, the value (d/fe) is 0.42, so that the viewfinder optical system of the present embodiment of the SLR digital camera has been successfully designed to have a high finder magnification while the aforementioned condition (1) is satisfied. Furthermore, the focal length of the glass block 9 is equal to infinity (ft=∞), and as mentioned above, the focal length (fe) of the eyepiece lens is 73.71 mm. The optical power can be obtained in accordance with condition (2):

$$|fe/ft| = |73.71/\infty| = 0 \qquad (2);$$

hence, the optical power of the glass block is zero.

EXAMPLE 2

In order to set the distance (L) between the exit surface 8d of the pentagonal roof prism 8 and the exit surface of the eyepiece 10 to 41.47 mm, the glass block 9, which is disposed between the pentagonal roof prism 8 and the eyepiece 10, has a thickness (d) of 32.50 mm along the optical axis $O_3$. The refractive index n of the glass block 9 is 1.5, so that the difference (d−d/n) between the actual thickness (d) and the reduced distance (d/n) is 10.83 mm. Consequently, the focal length (fe) of the eyepiece 10 is reduced by 10.83 mm to thereby become 79.57 mm, as compared with the case without the glass block 9 disposed between the pentagonal roof prism 8 and the eyepiece 10. In this particular example, the value (d/fe) is 0.41, so that the viewfinder optical system of the present embodiment of the SLR digital camera has been successfully designed to have a high finder magnification while the aforementioned condition (1) is satisfied. Furthermore, the focal length of the glass block 9 is equal to infinity (ft=∞), and as mentioned above, the focal length (fe) of the eyepiece lens is 73.71 mm The optical power can be obtained in accordance with condition (2):

$$|fe/ft| = |73.71/\infty| = 0 \qquad (2);$$

hence, the optical power of the glass block is zero.

As can be understood from the above description, according to the viewfinder optical system of a single-lens reflex camera to which the present invention is applied, the eyepiece can be positioned in the vicinity of the back face of the camera without any excessive increase the focal length of the eyepiece. This makes it possible to prevent the magnification of finder from being too low. Furthermore, since it is not necessary to increase the diameter of the eyepiece, the camera can be designed small and compact, while the user can easily look into the eyepiece.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A viewfinder optical system of a single-lens reflex camera having a photographic optical system and an image plane positioned on an optical axis of the photographic optical system, wherein the camera photographs an object image formed on the image plane through the photographic optical system, said viewfinder optical system comprising:

a first optical member positioned between the photographic optical system and the image plane, said first optical member bending the optical axis of the photographic optical system to define a viewfinder optical axis of said viewfinder optical system;

a second optical member which bends said viewfinder optical axis at least once to make said viewfinder optical axis extend parallel to the optical axis of the photographic optical system;

a third optical member, having substantially no optical power, positioned on the viewfinder optical axis which extends parallel to the optical axis of the photographic optical system, said third optical member transmitting, along the viewfinder optical axis, substantially all light incident onto said third optical member and being made of a transparent material having a refractive index higher than the refractive index of air; and an eyepiece positioned behind said third optical member on the viewfinder optical axis extending parallel to the optical axis of the photographic optical system.

2. The viewfinder optical system according to claim 1, wherein the following condition (1) is satisfied:

$$0.2 < d/fe < 0.6 \qquad (1);$$

wherein "d" represents the actual thickness of said third optical member in the direction of said viewfinder optical axis extending parallel to said optical axis of said photographic optical system, and "fe" represents the focal length of said eyepiece.

3. The viewfinder optical system according to claim 2, wherein the following condition (2) is satisfied:

$$|fe/ft| < 0.1 \qquad (2);$$

wherein

"fe" designates the focal length of said eyepiece; and
"ft" designates the focal length of said third optical member.

4. The viewfinder optical system according to claim 1, wherein said second optical member comprises a prism, said third optical member being positioned between said prism and said eyepiece.

5. The viewfinder optical system according to claim 4, wherein said prism is a pentagonal roof prism.

6. The viewfinder optical system according to claim 4, wherein said prism is a pentagonal roof mirror.

7. The viewfinder optical system according to claim 1, wherein said third optical member is made of glass.

8. The viewfinder optical system according to claim 1, wherein said first optical member comprises a quick-return mirror.

9. The viewfinder optical system according to claim 1, wherein said first optical member comprises a half mirror.

10. The viewfinder optical system according to claim 1, wherein said single-lens reflex camera is of a type using silver-halide film, said image plane corresponding to a sensitive surface of said silver-halide film.

11. The viewfinder optical system according to claim 1, herein said single-lens reflex camera is a digital single-lens reflex camera having an image pick-up device, said image plane corresponding to a sensitive surface of said image pick-up device.

12. The viewfinder optical system according to claim 11, wherein said image pick-up device comprises a CCD image sensor.

13. The viewfinder optical system according to claim 1, wherein said single-lens reflex camera is a digital single-lens reflex camera having an image pick-up device; said digital single-lens reflex camera comprising a shutter unit, said image pick-up device, and a recording medium, which are positioned behind said first optical member in that order from the first optical member side.

14. The viewfinder optical system according to claim 1, further comprising a focusing glass positioned between said first optical member and said second optical member.

15. The viewfinder optical system according to claim 1, wherein an incident surface of said third optical member is cemented to an exit surface of said second optical member.

16. The viewfinder optical system according to claim 1, wherein the following condition (2) is satisfied:

$$|fe/ft| < 0.1 \qquad (2);$$

wherein

"fe" designates the focal length of said eyepiece; and
"ft" designates the focal length of said third optical member.

17. A single-lens reflex camera comprising:

a photographic lens;

a mirror positioned behind said photographic lens;

a focusing glass positioned above said mirror, wherein an object image formed through said photographing lens is formed on said focusing glass via said mirror;

a pentagonal roof prism positioned above said focusing glass;

an eyepiece positioned optically behind said pentagonal roof prism; and a transparent optical member positioned between said pentagonal roof prism and said eyepiece, said transparent optical member comprising a transparent material having a refractive index between 1.4 and 2.0;

wherein said pentagonal roof prism and said transparent optical member have substantially no optical power; and wherein said eyepiece comprises an ocular optical system so that the image formed on the focusing glass can be viewed via said transparent optical member and said pentagonal roof prism.

18. The single lens reflex camera according to claim 17, wherein the following condition is satisfied:

$$0.2 < d/fe < 0.6$$

wherein

"d" represents the actual thickness of said transparent optical member in the optical axis direction of said eyepiece, and "fe" represents the focal length of said eyepiece.

19. The single lens reflex camera according to claim 17, wherein the following condition is satisfied:

$$|fe/ft| < 0.1;$$

wherein

"fe" designates the focal length of said eyepiece; and
"ft" designates the focal length of said transparent optical member.

20. The single-lens reflex camera according to claim 17, wherein said transparent optical member transmits, along an optical axis of said eyepiece, substantially all light incident onto said transparent optical member.

21. A single-lens reflex camera comprising:

a photographic lens which forms an object image onto an image surface of a recording medium;

a mirror positioned on an optical axis of said photographic lens to form an object image formed by said photographing lens onto a focusing screen;

an eyepiece, an optical axis of the eyepiece being parallel with an optical axis of said photographic lens;

a pentagonal roof prism positioned above said focusing screen; and a transparent optical member positioned between said pentagonal roof prism and said eyepiece, said transparent optical member comprising a transparent material having a refractive index between 1.4 and 2.0;

wherein the following condition is satisfied:

$$0.2 < d/fe < 0.6;$$

wherein

"d" represents the actual thickness of said transparent optical member in an optical axis direction of said eyepiece, and "fe" represents a focal length of said eyepiece.

* * * * *